(12) United States Patent
Yamaguchi

(10) Patent No.: US 11,781,877 B2
(45) Date of Patent: Oct. 10, 2023

(54) DELIVERY PLAN GENERATION METHOD, AND DELIVERY PLAN GENERATION DEVICE

(71) Applicant: Panasonic Intellectual Property Management Co., Ltd., Osaka (JP)

(72) Inventor: Koichiro Yamaguchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 556 days.

(21) Appl. No.: 16/855,452

(22) Filed: Apr. 22, 2020

(65) Prior Publication Data
US 2020/0249040 A1    Aug. 6, 2020

Related U.S. Application Data

(63) Continuation of application No. PCT/JP2018/038389, filed on Oct. 16, 2018.

(30) Foreign Application Priority Data

Oct. 27, 2017  (JP) .............................. JP2017-208407

(51) Int. Cl.
G01C 21/34    (2006.01)
G06Q 10/0832  (2023.01)
G06Q 10/0833  (2023.01)

(52) U.S. Cl.
CPC ..... *G01C 21/3484* (2013.01); *G01C 21/3492* (2013.01); *G06Q 10/0832* (2013.01); *G06Q 10/0833* (2013.01)

(58) Field of Classification Search
CPC ............ G01C 21/3484; G01C 21/3492; G06Q 10/0832; G06Q 10/0833
See application file for complete search history.

(56) References Cited

U.S. PATENT DOCUMENTS

| | | | |
|---|---|---|---|
| 2006/0069501 A1* | 3/2006 | Jung ................. | G08G 1/096827 701/457 |
| 2006/0106534 A1* | 5/2006 | Kawamata ......... | G01C 21/3889 701/532 |

(Continued)

FOREIGN PATENT DOCUMENTS

| | | |
|---|---|---|
| JP | 2008-275348 | 11/2008 |
| WO | 2005/108928 | 11/2005 |
| WO | 2010/129419 | 11/2010 |

OTHER PUBLICATIONS

Wouter J. Schakel, Integrated Lane Change Model with Relaxation and Synchronization, 2012, p. 47 (Year: 2012).*

(Continued)

*Primary Examiner* — Ibrahim N El-Bathy
(74) *Attorney, Agent, or Firm* — Wenderoth, Lind & Ponack, L.L.P.

(57) ABSTRACT

A delivery plan generation method includes: acquiring delivery range information regarding a delivery range of an article; acquiring feature information items for each of roads corresponding to the delivery range information; acquiring road network information indicating a connection relationship between the roads; acquiring learning information items each corresponding to a corresponding one of the feature information items; computing road costs each corresponding to a corresponding one of the roads based on the feature information items and the learning information items; and generating a delivery plan by using the road network information and the road costs. The learning information items are generated based on a travel history of a delivery vehicle delivering the article and the feature information items for each of roads corresponding to the travel history.

18 Claims, 9 Drawing Sheets

(56) References Cited

U.S. PATENT DOCUMENTS

| | | |
|---|---|---|
| 2008/0114542 A1 | 5/2008 | Nambata et al. |
| 2008/0270014 A1 | 10/2008 | Nagase et al. |
| 2010/0287073 A1 | 11/2010 | Kocis et al. |
| 2011/0238457 A1* | 9/2011 | Mason ............ G06Q 10/063112 |
| | | 705/7.14 |
| 2012/0185404 A1* | 7/2012 | Koh ..................... G06Q 10/083 |
| | | 705/335 |
| 2015/0278759 A1 | 10/2015 | Harris et al. |
| 2019/0049261 A1* | 2/2019 | Colby ................ G01C 21/3641 |
| 2019/0293446 A1* | 9/2019 | Cho ................... G01C 21/3664 |
| 2019/0391594 A1* | 12/2019 | Takano ................. G01C 21/30 |

OTHER PUBLICATIONS

Extended European Search Report dated Oct. 9, 2020 for the related European Patent Application No. 18869943.3.
International Search Report dated Jan. 8, 2019 in corresponding International Application No. PCT/JP2018/038389.

* cited by examiner

FIG. 5A

|    | S | D1 | D2 | D3 | D4 | D5 | D6 | D7 | D8 |
|----|---|----|----|----|----|----|----|----|----|
| S  |   | *  | *  | *  | *  | *  | *  | *  | *  |
| D1 | * |    | 10 | 25 | *  | *  | *  | *  | *  |
| D2 | * | *  |    | 10 | *  | *  | *  | 10 | *  |
| D3 | * | *  | *  |    | *  | *  | *  | *  | *  |
| D4 | * | *  | *  | *  |    | *  | *  | *  | *  |
| D5 | * | *  | *  | *  | *  |    | 10 | *  | *  |
| D6 | * | *  | 10 | *  | *  | *  |    | 10 | *  |
| D7 | * | *  | *  | *  | *  | *  | *  |    | *  |
| D8 | * | *  | *  | *  | *  | *  | *  | *  |    |

FIG. 5B

|    | S | D1 | D2 | D3 | D4 | D5 | D6 | D7 | D8 |
|----|---|----|----|----|----|----|----|----|----|
| S  |   | *  | *  | *  | *  | *  | *  | *  | *  |
| D1 | * |    | 10 | 5  | *  | *  | *  | *  | *  |
| D2 | * | *  |    | 10 | *  | *  | *  | 10 | *  |
| D3 | * | *  | *  |    | *  | *  | *  | *  | *  |
| D4 | * | *  | *  | *  |    | *  | *  | *  | *  |
| D5 | * | *  | *  | *  | *  |    | 10 | *  | *  |
| D6 | * | *  | 10 | *  | *  | *  |    | 10 | *  |
| D7 | * | *  | *  | *  | *  | *  | *  |    | *  |
| D8 | * | *  | *  | *  | *  | *  | *  | *  |    |

DELIVERY PLAN GENERATION METHOD, AND DELIVERY PLAN GENERATION DEVICE

BACKGROUND

1. Technical Field

The present disclosure relates to a road learning model generation device, a road learning model generation method, a delivery plan generation device, and a delivery plan generation method that support delivery of a plurality of packages to be delivered.

2. Description of the Related Art

As a prior art regarding optimally transporting cargoes by a transport vehicle, Patent Literature (PTL) 1 has been proposed.

For a plurality of transportation vehicles (for example, ships) that transports cargoes to various locations, for example, PTL 1 discloses a method for optimizing various transportation determination matters related to a transportation schedule and moving the plurality of transportation vehicles according to the optimized transportation determination matters.

For the transportation determination matters, at least transportation routes of the ships (that is, sea route) are used.

PTL 1 is International Publication No. WO 2010/129419.

SUMMARY

The present disclosure has been made in view of the conventional situation described above.

An object of the present disclosure is to provide, in delivery of a plurality of packages, a delivery plan generation method, and a delivery plan generation device.

The delivery plan generation method and the delivery plan generation device effectively support formulation of an optimal package delivery plan according to a road state to a delivery destination and reduce a burden on a driver who delivers each package.

The present disclosure provides a delivery plan generation method including: acquiring delivery range information regarding a delivery range of an article; acquiring feature information items for each of roads corresponding to the delivery range information; acquiring road network information indicating a connection relationship between the roads; acquiring learning information items each corresponding to a corresponding one of the feature information items; computing road costs each corresponding to a corresponding one of the roads based on the feature information items and the learning information items; and generating a delivery plan by using the road network information and the road costs. The learning information items are generated based on a travel history of a delivery vehicle delivering the article and the feature information items for each of roads corresponding to the travel history.

Also, the present disclosure provides A delivery plan generation device including: an acquisition unit that acquires delivery range information regarding a delivery range of an article; a road information storage unit that stores feature information items for each of roads corresponding to the delivery range information and road network information indicating a connection relationship between the roads; a road learning model storage unit that stores learning information items each a corresponding one of the feature information items; a road cost computation unit that computes road costs each corresponding to a corresponding one of the roads based on the feature information items and the learning information items; and a delivery plan computation unit that computes a delivery plan by using the road network information and the road costs. The learning information items are generated based on a travel history of a delivery vehicle delivering the article and the feature information items for each of roads corresponding to the travel history.

The present disclosure can, in delivery of a plurality of packages, effectively support formulation of an optimal package delivery plan according to a road state to a delivery destination and significantly reduce a burden on a driver who delivers each package.

BRIEF DESCRIPTION OF DRAWINGS

FIG. 5A is a table showing one example of road distances between respective delivery destinations before learning.

FIG. 5B is a table showing one example of delivery costs corresponding to roads between respective delivery destinations after learning.

Figure 1:
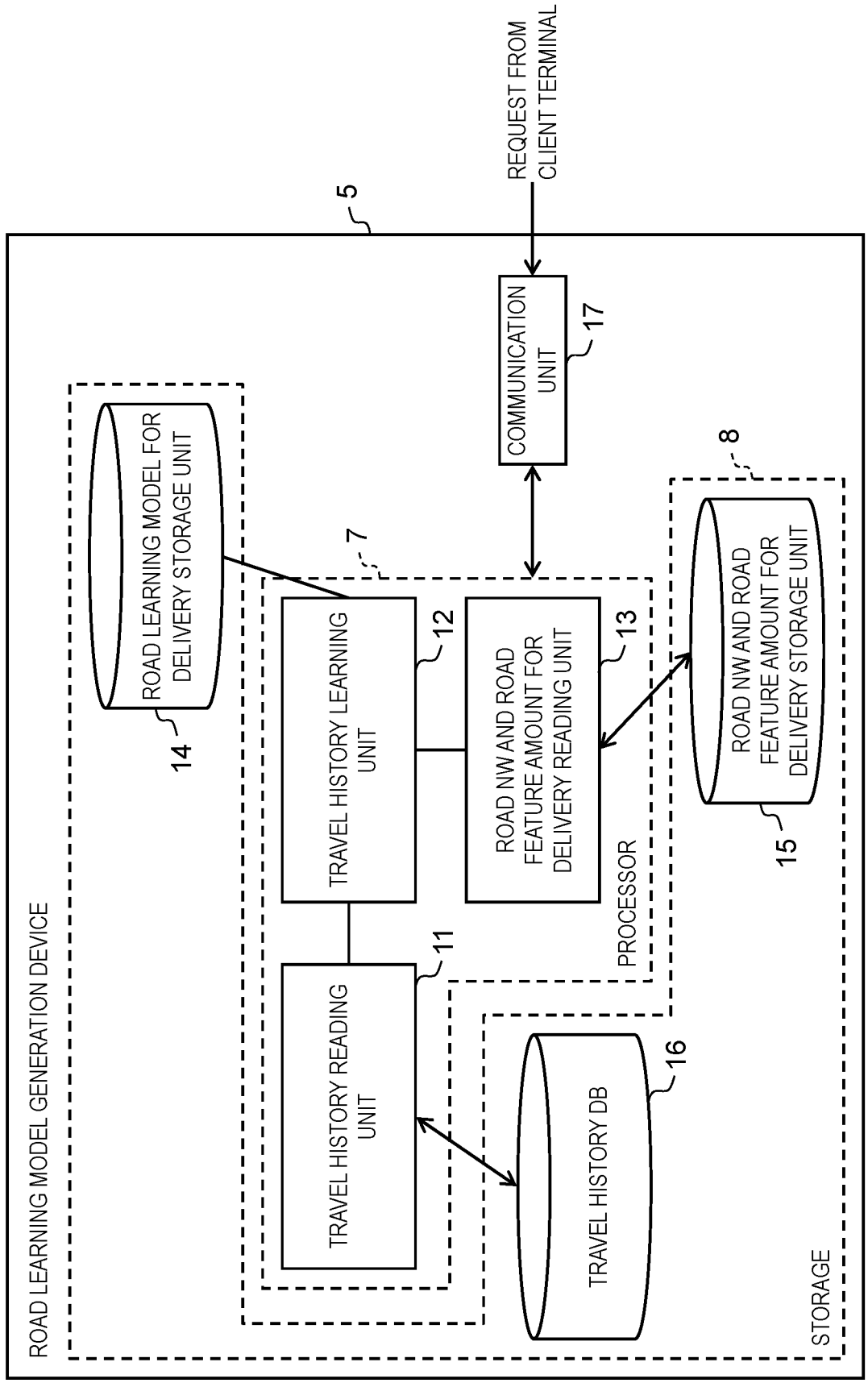
FIG. 1 is a block diagram showing in detail one example of an internal configuration of a road learning model generation device according to a first exemplary embodiment.

DETAILED DESCRIPTION (Circumstances Leading to Details of Each Exemplary Embodiment)

In PTL 1 described above, the transportation route used to optimize the transportation determination items is information fixed in advance such as a physical distance a ship can navigate between a first anchorage and a second anchorage of the ship. When the method described in PTL 1 is applied to generation of a delivery plan when a plurality of packages is delivered described above, a delivery plan will be formulated using static road information that does not change (for example, a physical distance a delivery vehicle can travel between delivery destinations on a map). Therefore, there is a problem that, for example, even in a case where there is a road with a short distance between delivery destinations, if the road is crowded, causing congestion, the packages may not be delivered as planned.

In delivery of packages, a skilled driver (that is, a highly experienced driver with considerable experiences) is believed to be used to delivering a plurality of packages efficiently. However, the prior art including PTL 1 does not consider using a travel history of a road traveled by such a skilled driver to reflect the travel history on generation of a package delivery plan. Therefore, in package delivery, it is difficult to formulate an optimal package delivery plan according to a road state to a delivery destination.

Therefore, the following exemplary embodiments describe, in delivery of a plurality of packages, examples of a road learning model generation device, a road learning model generation method, a delivery plan generation device, and a delivery plan generation method that effectively support formulation of an optimal package delivery plan according to a road state to a delivery destination and reduce a burden on a driver who delivers each package.

Hereinafter, with reference to the drawings as appropriate, each exemplary embodiment that specifically discloses a road learning model generation device, a road learning model generation method, a delivery plan generation device, and a delivery plan generation method according to the present disclosure will be described in detail. However, an unnecessarily detailed description may be omitted. For example, a detailed description of a well-known matter or a duplicate description of substantially the same configuration may be omitted. This is to avoid unnecessary redundancy in the following description and to facilitate understanding by those skilled in the art. Note that the accompanying drawings and the following description are provided for those skilled in the art to fully understand the present disclosure, and are not intended to limit the subject described in the claims.

The road learning model generation device and the delivery plan generation device according to the present exemplary embodiments may include the same device, or may include separate devices. When the road learning model generation device and the delivery plan generation device include the same device (for example, a server device), the server device is embodied as the road learning model generation device by performing each process (each step) constituting the road learning model generation method. In addition, the server device is embodied as the delivery plan generation device by performing each process (each step) constituting the delivery plan generation method at timing different from timing when performing the road learning model generation method described above.

(First Exemplary Embodiment: Road Learning Model Generation Device)

FIG. 1 is a block diagram showing in detail one example of an internal configuration of road learning model generation device 5 according to a first exemplary embodiment. Road learning model generation device 5 includes, for example, a computer such as a personal computer (PC) or a server device, and mainly includes processor 7, storage 8, and communication unit 17.

Processor 7 includes, for example, a central processing unit (CPU), a micro processing unit (MPU), a digital signal processor (DSP), or a field-programmable gate array (FPGA). Processor 7 has a functional configuration including travel history reading unit 11, travel history learning unit 12, and road NW (NW: abbreviation of network) and road feature for delivery reading unit 13. In other words, these units (that is, travel history reading unit 11, travel history learning unit 12, road NW and road feature for delivery reading unit 13) are a functional configuration that is executed by processor 7 when processor 7 reads a program and data corresponding to each unit.

Storage 8 includes, for example, a flash memory, a hard disk drive (HDD) or a solid state drive (SSD). Storage 8 includes road learning model for delivery storage unit 14, road NW and road feature for delivery storage unit 15, and travel history database (DB: abbreviation of database) 16.

Next, each unit constituting road learning model generation device 5 shown in FIG. 1 will be described.

Travel history reading unit 11 reads travel history data registered in travel history DB 16. The travel history data is, for example, a history of one or more roads traveled by a delivery vehicle (for example, a truck) in which a skilled driver (that is, a highly experienced driver with considerable experiences) is aboard when delivering a package to a desired delivery destination. Specifically, the travel history data is a set of road IDs (one example of road identifier) that identify each of one or more roads traveled by the delivery vehicle in which the skilled driver is aboard when delivering a package to a desired delivery destination. Details of the road ID will be described later.

Road NW and road feature for delivery reading unit 13 reads road network information registered (stored) in road NW and road feature for delivery storage unit 15 and data of a feature amount of each road constituting a route from the current position to the delivery destination (hereinafter referred to as "road feature amount"). The road network information is so-called road map information (map data), and is information indicating a connection relationship between any road on the road map and another road connected to the road.

Based on the travel history data read by travel history reading unit 11 and the road network information and road feature amount data read by road NW and road feature for delivery reading unit 13, travel history learning unit 12 generates a road learning model corresponding to an applicable area of the road network information (in other words, package delivery range). The road learning model is generated, for example, by inverse reinforcement learning of artificial intelligence (AI: abbreviation of artificial intelligent) constituting travel history learning unit 12. The road learning model inputs, as input data, the road feature amount data of the road corresponding to the road ID (one example of feature information item of the road), and outputs, as output data, a road cost (see below) corresponding to the road. Note that one example of the road cost corresponds to a reciprocal of the output (that is, reward) obtained by inverse reinforcement learning (that is, 1/(reward of inverse reinforcement learning)).

Here, the inverse reinforcement learning (IRL) refers to estimating what kind of action is how good, for example, based on action performed by a skilled person. By quantitatively calculating how good, it is possible to generate action very similar to the action of the skilled person. For example, when a driver, a delivery person, drives a delivery vehicle for delivering a plurality of packages, it is presumed that which delivery route should be traveled differs between a skilled driver and a non-skilled driver (that is, an inexperienced general driver).

Therefore, road learning model generation device 5 according to the present exemplary embodiment can obtain an indicator for determining an appropriate delivery plan (for example, a road cost described later) by determining how good the delivery route selected by the skilled driver (in other words, travel history) is by inverse reinforcement learning, and can support preparation of a delivery plan that allows smooth delivery as the skilled driver makes. Therefore, inverse reinforcement learning is performed, for example, by machine learning using the travel history of the skilled driver as teacher data. Note that machine learning may be performed in real time while the skilled driver is traveling, or may be performed after the skilled driver travels. The travel history of the skilled driver may include not only the travel history of one skilled driver but also the travel history of a plurality of skilled drivers.

Travel history learning unit 12 of road learning model generation device 5 according to the present exemplary embodiment may construct the road learning model by machine learning without using AI. In this case, road cost for delivery computation unit 31 described later may determine the road cost by using the road learning model. For example, travel history learning unit 12 of road learning model generation device 5 according to the present exemplary embodiment learns the travel history of the road the skilled driver has actually traveled to lower the road cost of the road the skilled driver often travels. That is, travel history learning unit 12 may compute the road cost that decreases as a number of times of passing through the target road increases according to equation (1) based on a road distance, which is one of the road feature amount (that is, edge distance between two nodes constituting the road).

$$\text{Road cost} = \text{road distance} \times (1 - \text{total number of traffic on target road}/\text{total number of traffic on entire road}) \quad (1)$$

Here, the total number of traffic on the target road and the total number of traffic on the entire road are obtained from the travel history stored in travel history DB 16. Also, the total number of traffic on the target road is a vector value, and is treated as a separate count value when the direction in which the delivery vehicle travels on the same target road is different, and is treated as the same count value only when the vehicle travels in the same direction. For example, the number of times the delivery vehicle travels from the north to the south on the same target road and the number of times the vehicle travels from the south to the north are different count values, and are not added and used.

Road learning model for delivery storage unit 14 (one example of a road learning model storage unit) stores the road learning model for delivery generated by travel history learning unit 12 (hereinafter referred to as "road learning model") in association with the package delivery range. The road learning model is generated for each package delivery range, and the road feature amount input as input data is converted into the road cost and output. A plurality of road learning models is generated according to characteristics of areas, for example, a high area such as a basin, a low area such as a flat land, an area that is not often visited, and the like as the delivery range. Note that if a delivery plan is generated for a package delivery range for which a road learning model has not been generated, a road learning model may be substituted that corresponds to an already generated other delivery range that has a road feature amount similar to the road feature amount of the road in the package delivery range.

Here, the road ID will be briefly described.

Figure 2:
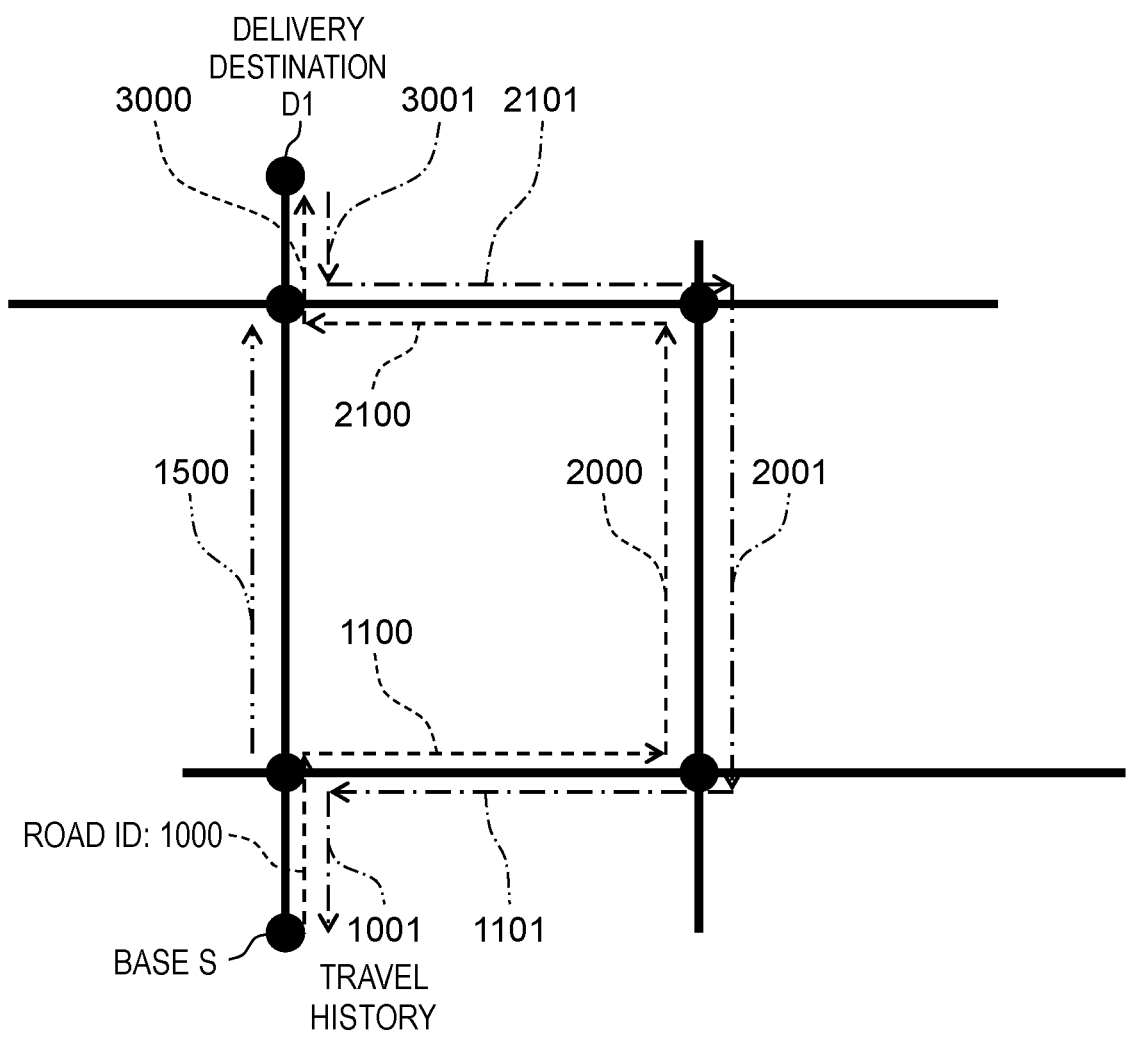
FIG. 2 is an explanatory diagram showing one example of a travel history of a delivery route from a base S to a delivery destination D1 stored in a travel history database (DB).

The road ID is identifier about a road, and is identifier that differs depending on a direction even for an identical road (see FIG. 2). One road includes two nodes corresponding to both ends of the road and an edge between the two nodes. An edge distance (in other words, distance between two nodes) corresponds to a road distance. The road cost is a value obtained by changing (converting) the road feature amount of the road identified by the road ID (including road distance information) by the road learning model, and indicates delivery efficiency of a package (article) when a delivery vehicle travels the road. Therefore, if the road cost is high, the delivery efficiency when the delivery vehicle travels the road is not good, and on the other hand, if the road cost is low, the delivery efficiency when the delivery vehicle travels the road is good.

Road NW and road feature for delivery storage unit 15 (one example of a road information storage unit) stores the road network information including the road map and the road feature amount corresponding to each road on the road map. The road feature amount includes, corresponding to each road, for example, the distance information of the road, right or left turn information of the road, width information of the road, median strip information of the road, trunk road crossing information of the road, elevation variation information of the road, and the road ID of the road. In the following description, the road feature amount is required to include at least the distance information corresponding to each road (that is, road ID), and to further include at least one of the right or left turn information, the width information, the median strip information, the trunk road crossing information, and the elevation variation information. Note that the road feature amount may include all the distance information, the right or left turn information, the width information, the median strip information, the trunk road crossing information, and the elevation variation information corresponding to each road (that is, road ID).

The distance information represents the distance of the road identified by the road ID (in other words, distance of an edge if the road includes two nodes corresponding to both ends of the road and the edge between the two nodes). Therefore, the distance information is specifically represented by a numerical value indicating the distance of the road.

The right or left turn information is information representing whether the road identified by the road ID turns right or left, and specifically includes presence and a number of right or left turns. Generally, when there is a right or left turn, a speed limit of a vehicle is set low, and it is determined that travel time is long, leading to a higher road cost. Conversely, for a straight road without a right or left turn, the speed limit of a vehicle may not be set low, and it is determined that the travel time is short, leading to a lower road cost. Note that the right or left turn information may include, as information, whether there is a right or left turn from the immediately preceding road ID to the target road ID.

The width information is information representing the width of the road identified by the road ID, and is specifically represented by a numerical value. The width of the road may be a distance from one end to the other end in the width direction of the road, or a distance of each lane in the width direction. Generally, when the width of the road is narrow, it is determined that the travel speed becomes slow, leading to a higher road cost. Conversely, when the width of the road is wide, it is determined that the travel speed becomes fast, leading to a lower road cost.

The median strip information represents presence of a median strip on the road identified by the road ID. Generally, when there is a median strip, it is determined that a vehicle flow is smooth and the travel speed becomes fast, leading to a lower road cost. Conversely, when there is no median strip, it is determined that the travel speed becomes slow due to passing an oncoming vehicle, leading to a higher road cost.

The trunk road crossing information represents whether a trunk road intersects (crosses) the road identified by the road ID, specifically, whether there is a trunk road crossing. Generally, when a trunk road crosses the road, it is determined that traffic volume is high, leading to a higher road cost. Conversely, when no trunk road crosses the road, it is determined that traffic volume is low, leading to a lower road cost. Note that the trunk road crossing information may include information as to whether a terminal node of the road ID is connected to a trunk road.

The elevation variation information represents presence of an elevation variation such as an uphill or downhill on the road identified by the road ID. Generally, when there is an elevation variation, it is determined that congestion is likely to occur, leading to a higher road cost. Conversely, when there is no elevation variation, the vehicle flow is smooth, leading to a lower road cost.

Note that the road feature amounts described above are only one example. In addition to these road feature amounts, information including signal information representing a number of traffic signals installed on the road, road surface information representing unpaved road surfaces and the like may be used as the road feature amount.

Determination based on the road feature amounts described above is one example of general determination, and cannot be made without actual travel. It is very well assumed that determination different from the above determination is made by actual travel. In the present exemplary embodiment, travel history learning unit 12 generates the road learning model by using artificial intelligence (AI). Therefore, in the road learning model obtained by learning by travel history learning unit 12 based on the travel history data traveled by the skilled driver as teacher data, the road feature amount can be converted into an appropriate road cost, reflecting an actual state of the delivery vehicle that has passed the road.

Travel history DB 16 (one example of a travel history storage unit) stores the travel history of the delivery route traveled by the skilled driver. The delivery route of the skilled driver is stored, for example, in a memory card by a vehicle-mounted device (GPS receiver, car navigation system, digital tachograph, or the like). After the travel, the skilled driver may cause road learning model generation device 5 to read the data of the delivery route stored in this memory card and store the data in travel history DB 16. Road learning model generation device 5 may communicate with a GPS receiver mounted on the delivery vehicle (truck or the like) on which the skilled driver is aboard, sequentially acquire current positions of the delivery vehicle, and store the delivery route during travel (real time) in travel history DB 16.

Here, the travel history of the delivery route traveled by the skilled driver will be described.

FIG. 2 is an explanatory diagram showing one example of the travel history of the delivery route from a base S to a delivery destination D1, stored in travel history DB 16. When the delivery vehicle heads from the base S to the delivery destination D1, if a delivery route of the shortest distance is prioritized, three straight roads with road IDs "1000", "1500", and "3000" are selected. However, for example, if congestion is likely to occur on the road with the road ID "1500" depending on a time zone, this shortest distance delivery route is not an optimal delivery route for the driver to deliver a package more smoothly. General drivers who are not skilled drivers tend to travel by selecting the three roads with priority given to distance (see above).

However, when heading from the base S to the delivery destination D1, since the skilled driver knows well characteristics (in other words, feature amount) of the roads from the base S to the delivery destination D1, the skilled driver selects a detour delivery route by using five roads of road IDs "1000", "1100", "2000", "2100", and "3000." This detour delivery route, which has a longer distance than the shortest distance, is an optimal delivery route for smoother package delivery, for example, for the skilled driver who knows well that the road with the road ID "1500" is crowded by congestion. Therefore, the travel history DB 16 stores, as travel history data between the base S and the delivery destination D1, a set of road IDs of all roads included in the detour delivery route selected by the skilled driver (specifically, CSV format data "1000, 1100, 2000, 2100, 3000").

Note that even the same road has different road IDs as described above if the direction of the road traveled by the delivery vehicle is different between the forward direction and the reverse direction. For example, in the detour delivery route described above, when heading from the delivery destination D1 to the base S, the road IDs constituting the delivery route are "3001, 2101, 2001, 1101, 1001", which are different from the road IDs constituting the delivery route from the base S to the delivery destination D1 (specifically, "1000, 1100, 2000, 2100, 3000") even if the same detour delivery route is used.

Communication unit 17 is connected, for example, to a client terminal (not shown) via a wireless local area network (LAN). Communication between communication unit 17 and the client terminal is not limited to the wireless LAN, but may be connected by a wired LAN, or may be directly connected via an interface such as serial communication/parallel communication. Communication unit 17 (one example of an acquisition unit) functions as a communication interface that manages communication between road learning model generation device 5 and the connected client terminal. Communication unit 17 receives, for example, a model generation request from the client terminal (that is, a request to generate the road learning model corresponding to the package delivery range).

Next, an operation of road learning model generation device 5 according to the present exemplary embodiment will be described.

Figure 3:
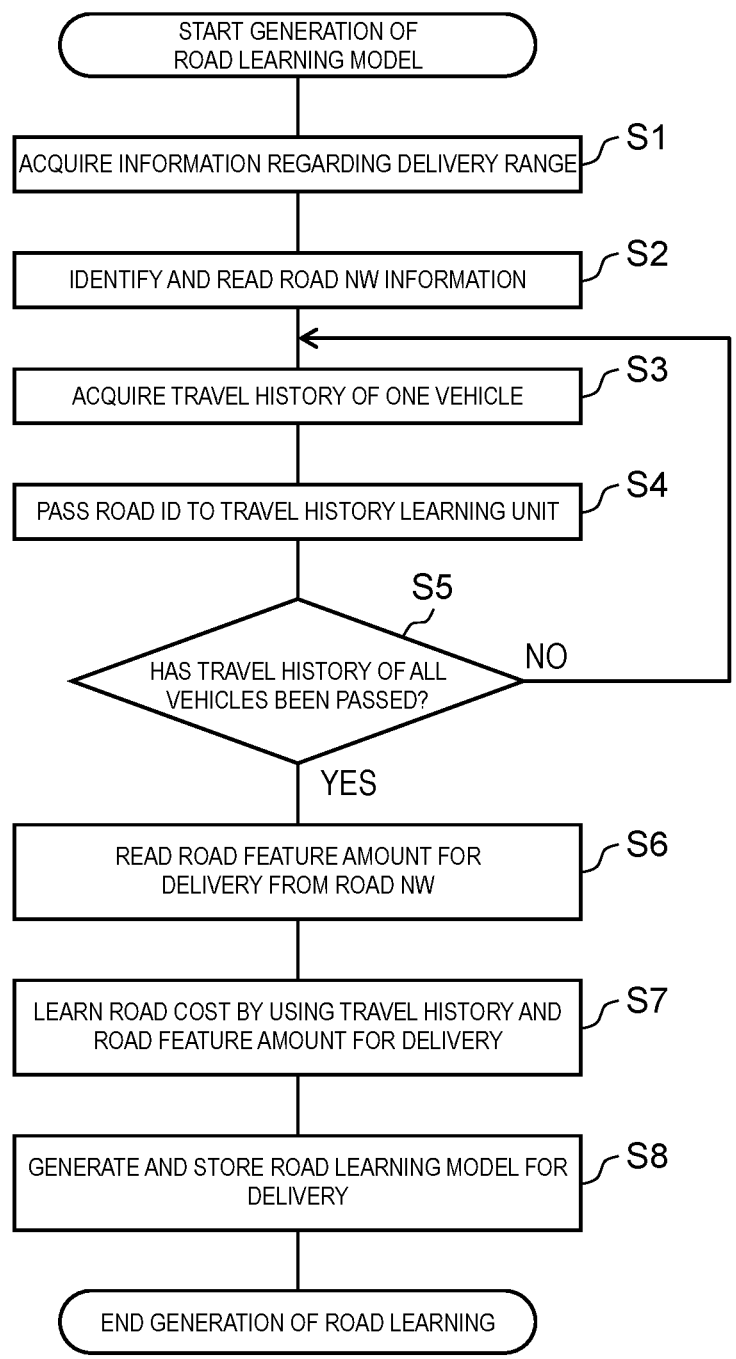
FIG. 3 is a flowchart showing in detail one example of a procedure for generating a road learning model in the road learning model generation device according to the first exemplary embodiment.

FIG. 3 is a flowchart showing in detail one example of a procedure for generating the road learning model in road learning model generation device 5 according to the first exemplary embodiment.

In FIG. 3, processor 7 receives and acquires information regarding the package delivery range, which is input from a user operation and transmitted from the client terminal (S1). Road NW and road feature for delivery reading unit 13 accesses road NW and road feature for delivery storage unit 15, and identifies and reads the road network information corresponding to the package delivery range acquired in step S1 (S2).

Regarding the road network information identified in step S2, travel history reading unit 11 reads and acquires the travel history of one vehicle of the skilled driver from travel history DB 16 (S3). Travel history reading unit 11 passes the acquired travel history of one vehicle (that is, a set of road IDs of all roads that constitute the delivery route traveled by the one delivery vehicle) to travel history learning unit 12 (S4). Regarding the road network information identified in step S2, travel history reading unit 11 determines whether the travel history of all vehicles of the skilled driver has been acquired from travel history DB 16 and passed to travel history learning unit 12 (S5). When the travel history of all vehicles has not been passed (S5, NO), the process returns to the processing step S3 of road learning model generation device 5.

On the other hand, when travel history reading unit 11 acquires the travel history of all vehicles and passes the travel history to travel history learning unit 12 (S5, YES), road NW and road feature for delivery reading unit 13 accesses road NW and road feature for delivery storage unit 15, and identifies and reads the road feature amount of each road constituting the package delivery range acquired in step S1 (S6). Based on the road feature amount read by road NW and road feature for delivery reading unit 13 in step S6 and the travel history of all vehicles passed from travel history reading unit 11 in step S4, travel history learning unit 12 learns the travel history of the delivery route traveled by the skilled driver in the past in the package delivery range acquired in step S1 (S7).

As learning results in step S7, travel history learning unit 12 generates the road learning model for calculating the road cost for each road indicating the delivery efficiency during travel in one or more roads included in the package delivery range acquired in step S1. Travel history learning unit 12 stores the generated road learning model in road learning model for delivery storage unit 14 in association with the package delivery range acquired in step S1 (S8). After step S8, processing of road learning model generation device 5 ends.

As described above, in road learning model generation device 5 of the first exemplary embodiment, travel history DB 16 stores the travel history of the road during package (article) delivery by the delivery vehicle driven by the skilled driver. Road NW and road feature for delivery storage unit 15 stores the road network information and the road feature amount (one example of information regarding the road). Communication unit 17 obtains information regarding the package delivery range. Based on the travel history, the road network information, and the road feature amount of the road during package delivery by the delivery vehicle corresponding to the package delivery range, travel history learning unit 12 generates the road learning model for calculating the road cost indicating the delivery efficiency during travel of one or more roads included in the package delivery range, for each of one or more roads. Road learning model for delivery storage unit 14 stores the generated road learning model in association with information regarding the package delivery range.

With this configuration, regardless of the type of skilled driver or general driver, road learning model generation device 5 can efficiently generate the road learning model that can calculate the road cost with high delivery efficiency when the driver delivers a plurality of packages. Also, since road learning model generation device 5 can improve calculation accuracy of the road cost using the road learning model by using the travel history of the delivery vehicle driven by the skilled driver, road learning model generation device 5 can support formulation of an optimal delivery plan that matches the actual road state by using this road learning model.

In addition, the information regarding the road includes the road network (NW) information and the feature information items including information on the road distance. With this configuration, road learning model generation device 5 can generate the road learning model that can calculate the road cost reflecting the actual road state.

The travel history is a set of road IDs each identifying one or more roads traveled when the delivery vehicle delivers packages. With this configuration, road learning model generation device 5 can accurately acquire the travel history of each road indicating the delivery route traveled by the skilled driver during package delivery in the past.

In addition, the road feature amount includes the right or left turn information of the road. With this configuration, road learning model generation device 5 can generate the road learning model that can calculate the road cost that accurately reflects an actual congestion state or vacancy state of the road based on presence of right or left turn. In particular, the right or left turn information is information representing whether the road turns right or left, and includes, for example, presence and number of right or left turns. Generally, when there is a right or left turn, a speed limit of the vehicle is set low, and it is determined that travel time is long, leading to a higher road cost. Conversely, when there is no right or left turn, the speed limit of the vehicle is set high, and it is determined that the travel time is short, leading to a lower road cost.

In addition, the road feature amount includes width information of the road. With this configuration, road learning model generation device 5 can generate the road learning model that can calculate the road cost that accurately reflects the actual congestion state or vacancy state of the road based on a difference in the width information of the road. In particular, the width information is information representing the road width, and is represented by a numerical value. Generally, when the road width is narrow, it is determined that the travel speed becomes slow, leading to a higher road cost. Conversely, when the road width is wide, it is determined that the travel speed becomes fast, leading to a lower road cost.

In addition, the road feature amount includes median strip information of the road. With this configuration, road learning model generation device 5 can generate the road learning model that can calculate the road cost that accurately reflects the actual congestion state or vacancy state of the road based on presence of a median strip on the road. In particular, the median strip information represents the presence of a median strip. Generally, when there is a median strip, it is determined that a vehicle flow is smooth and the travel speed becomes fast, leading to a lower road cost. Conversely, when there is no median strip, it is determined that the travel speed becomes slow due to passing an oncoming vehicle, leading to a higher road cost.

In addition, the road feature amount includes the trunk road crossing information of the road. With this configuration, road learning model generation device 5 can generate the road learning model that can calculate the road cost that accurately reflects the actual congestion state or vacancy state of the road based on whether the road crosses a trunk road. In particular, the trunk road crossing information represents whether a trunk road crosses the road. Generally, when a trunk road crosses the road, it is determined that traffic volume is high, leading to a higher road cost. Conversely, when no trunk road crosses the road, it is determined that traffic volume is low, leading to a lower road cost.

In addition, the road feature amount includes the elevation variation information of the road. With this configuration, road learning model generation device 5 can generate the road learning model that can calculate the road cost that accurately reflects the actual congestion state or vacancy state of the road based on presence of the elevation variation of the road. In particular, the elevation variation information represents presence of an elevation variation such as an uphill or downhill, or an extent of the elevation variation (for example, height information represented by a numerical value). Generally, when there is an elevation variation, it is determined that congestion is likely to occur, leading to a higher road cost. Conversely, when there is no elevation variation, the vehicle flow is smooth, leading to a lower road cost.

Also, road learning model generation device 5 generates the road learning model in travel history learning unit 12 in response to a model generation request including information regarding the package delivery range based on the user operation from the client terminal (not shown) connected to the own device (that is, road learning model generation device 5). With this configuration, road learning model generation device 5 can generate the road learning model according to the model generation request from the client terminal with the user operation serving as a trigger. Therefore, the user can easily provide an instruction to generate or update the road learning model for a new delivery range (for example, unlearned delivery range) or a delivery range that has already been learned, and usability of the user when generating or updating the road learning model is improved.

(Second Exemplary Embodiment: Delivery Plan Generation Device)

Next, a delivery plan generation device and a delivery plan generation method for formulating (generating) a delivery plan when delivering a plurality of packages by using the road learning model generated by road learning model generation device 5 according to the first exemplary embodiment will be described.

In the second exemplary embodiment, the delivery plan is a delivery route (that is, travel order of a plurality of delivery destinations) determined to minimize a delivery cost (see below) based on a road cost when delivering packages (articles) from a base to the plurality of delivery destinations by using at least one delivery vehicle (for example, truck) within a predetermined period (for example, during the one day).

Figure 4:
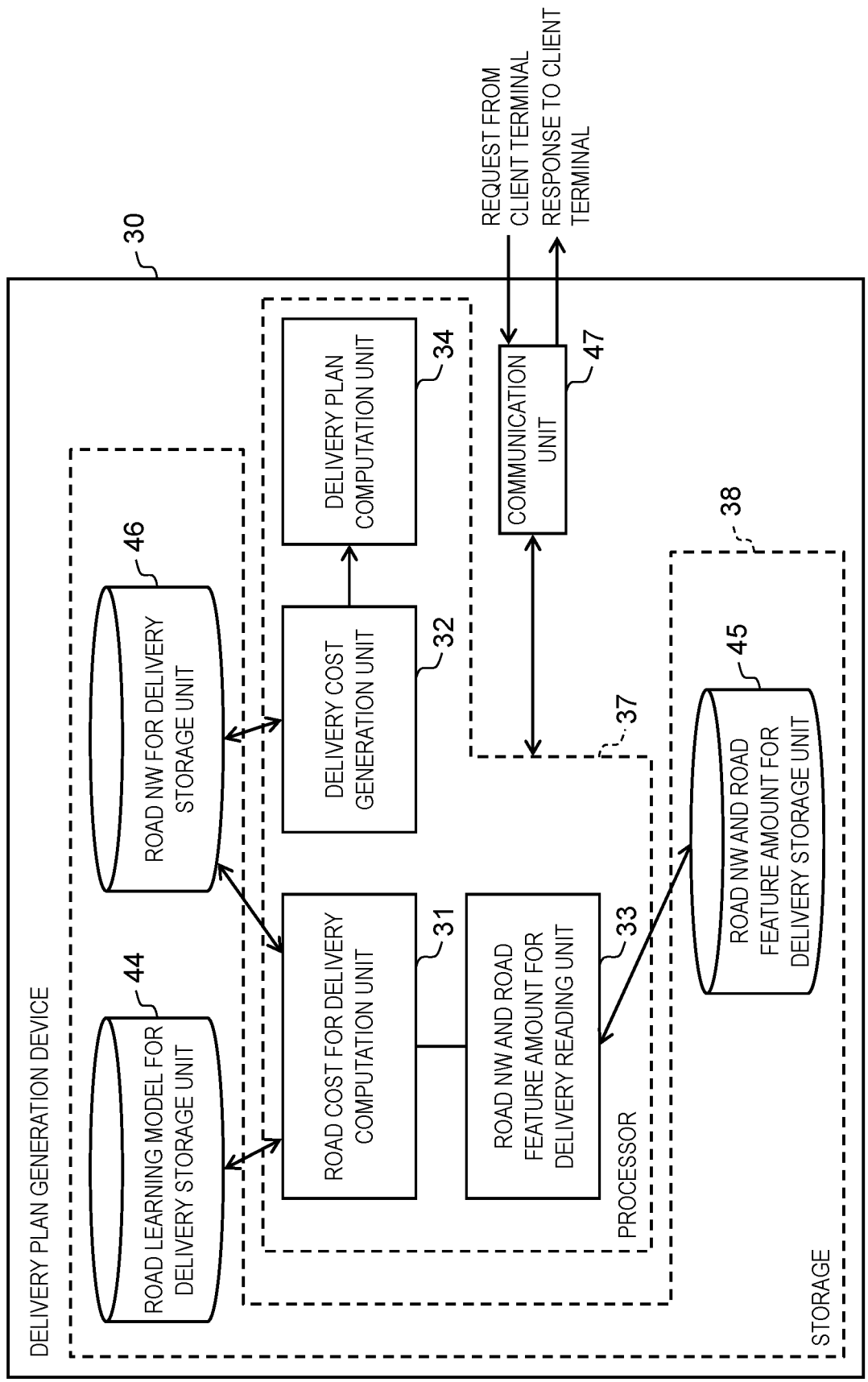
FIG. 4 is a block diagram showing in detail one example of an internal configuration of a delivery plan generation device according to a second exemplary embodiment.

FIG. 4 is a block diagram showing in detail one example of an internal configuration of delivery plan generation device 30 according to the second exemplary embodiment. In a similar manner to road learning model generation device 5, delivery plan generation device 30 includes, for example, a computer such as a PC or a server device, and mainly includes processor 37, storage 38, and communication unit 47. As described above, delivery plan generation device 30 may include the same PC or server device as road learning model generation device 5, or may include a separate PC or server device. When delivery plan generation device 30 includes the same PC or server device, timing when the PC or server device functions as road learning model generation device 5 is different from timing when the PC or server device functions as delivery plan generation device 30.

Processor 37 includes, for example, a CPU, an MPU, a DSP, or an FPGA. Processor 37 has a functional configuration including road cost for delivery computation unit 31, delivery cost generation unit 32, road NW and road feature for delivery reading unit 33, and delivery plan computation unit 34. In other words, each of these units (that is, road cost for delivery computation unit 31, delivery cost generation unit 32, road NW and road feature for delivery reading unit 33, delivery plan computation unit 34) is a functional configuration executed by processor 37 when processor 37 reads a program and data corresponding to each unit.

Storage 38 includes, for example, a flash memory, an HDD, or an SSD. Storage 38 includes road learning model for delivery storage unit 44, road NW and road feature for delivery storage unit 45, and road NW for delivery storage unit 46.

Next, each unit constituting delivery plan generation device 30 shown in FIG. 4 will be described. Note that in each unit of delivery plan generation device 30, a duplicate description of the same configuration as each unit of road learning model generation device 5 will be simplified or omitted after a description of correspondence of signs.

Road learning model for delivery storage unit 44 (one example of a road learning model storage unit) has the same configuration as road learning model for delivery storage unit 14 of FIG. 1. Road learning model for delivery storage unit 44 stores the road learning model generated by road learning model generation device 5 in association with information regarding a package delivery range for the generation.

Road NW and road feature for delivery storage unit 45 (one example of a road information storage unit) has the same configuration as road NW and road feature for delivery storage unit 15 of FIG. 1. Road NW and road feature for delivery storage unit 45 stores road network information including a road map and a road feature amount corresponding to each road on the road map.

Road NW for delivery storage unit 46 stores, in association with a road ID, a result computed by road cost for delivery computation unit 31 (that is, a road cost corresponding to the road identified by the road ID) by using the road learning model stored in road learning model for delivery storage unit 44.

Road NW and road feature for delivery reading unit 33 has the same configuration as road NW and road feature for delivery reading unit 13 of FIG. 1. Road NW and road feature for delivery reading unit 33 reads the road network information registered (stored) in road NW and road feature for delivery storage unit 45 and the road feature amount of each road constituting a route from the current position to the delivery destination.

Note that delivery plan generation device 30 according to the present exemplary embodiment may use the road network information of a target area in which learning by travel history learning unit 12 has not been performed (so-called unlearned area) based on a delivery plan generation request from a client terminal based on a user operation (see below). Road NW and road feature for delivery storage unit 45 stores the road network information of the unlearned area and the road feature amount corresponding to the road in the unlearned area. Therefore, if the road feature amount (excluding road ID) of the road in the unlearned area is similar to the road feature amount (excluding road ID) of the road in a learned area, road NW and road feature for delivery reading unit 33 may read the road network information in the learned area as the road network information in another unlearned area. With this configuration, even in another unlearned area, delivery plan generation device 30 can formulate the delivery plan in a similar manner to the learned area in which the skilled driver has made delivery.

Based on the road network information and the road feature amount read by road NW and road feature for delivery reading unit 33 and the road learning model stored in road learning model for delivery storage unit 44, road cost for delivery computation unit 31 (one example of a road cost computation unit) computes the road cost for each road ID that identifies each of one or more roads. Road cost for delivery computation unit 31 stores a road cost computation result for each road ID in road NW for delivery storage unit 46 in association with the corresponding road ID.

Delivery cost generation unit 32 (one example of a delivery cost computation unit) generates, for example, the delivery cost from the current position (that is, starting point) to the next delivery destination (that is, destination) based on a road cost database corresponding to the road ID stored in road NW for delivery storage unit 46. Here, the delivery cost refers to package delivery efficiency when the delivery vehicle travels the delivery route that is formed by connecting one or more roads (for example, a delivery route including one or more roads connecting one delivery destination to the next delivery destination). Specifically, the delivery cost refers to an addition value of road costs of the roads constituting the delivery route. For example, if the delivery route includes "road of road ID (=101)+road of road ID (=102)+road of road ID (=103)" and the road costs are 10, 15, 20, respectively, the delivery cost is 45 (=10+ 15+20).

FIG. 5A is a table showing one example of road distances between respective delivery destinations before learning. FIG. 5B is a table showing one example of delivery costs corresponding to roads between respective delivery destinations after learning. In descriptions of FIGS. 5A and 5B, a base S and delivery destinations D1, D2, D3, D4, D5, D6, D7, D8 all represent nodes. The base S and the delivery destinations D1 to D8 in the vertical direction represent starting points. The base S and the delivery destinations D1 to D8 in the horizontal direction represent destinations. In the table representing the road distances between respective delivery destinations before learning, the distance from the delivery destination D1 to the delivery destination D3 is represented as "25." Meanwhile, after learning by travel history learning unit 12, the delivery cost from the delivery destination D1 to the delivery destination D3 is represented as "5." Delivery plan generation device 30 according to the present exemplary embodiment generates the delivery plan based on the delivery cost corresponding to the road, not on the road distance from the current position to the next delivery destination as in FIG. 5A. Therefore, the delivery route with a low delivery cost shown in FIG. 5B is selected (that is, road cost corresponding to one road, or an addition value of the road costs corresponding to a plurality of roads). Note that in the description of FIGS. 5A and 5B, delivery cost (distance) values between other two points are the same, and "*" shown in the tables represents an arbitrary value.

Figure 6:
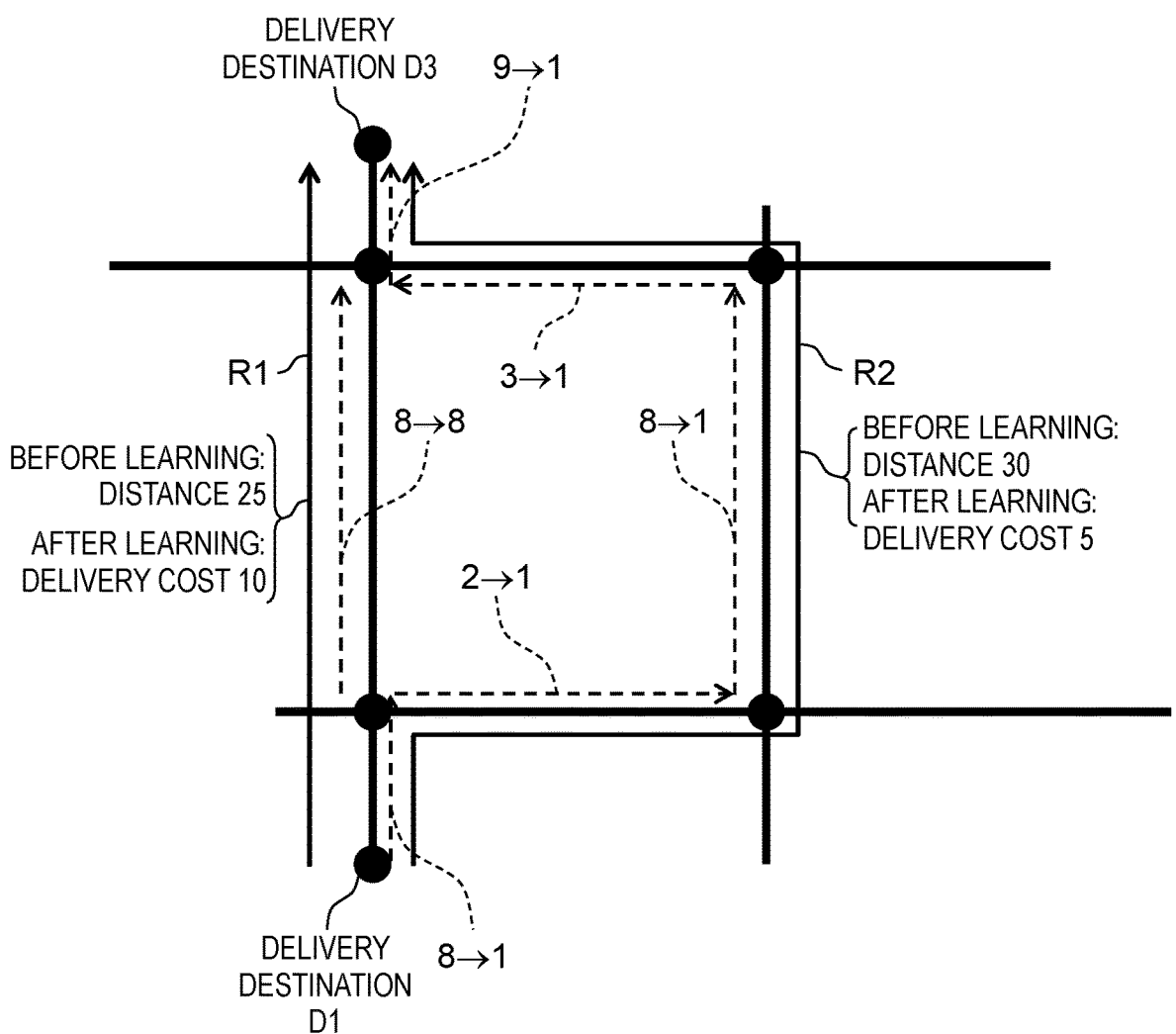
FIG. 6 is an explanatory diagram showing one example of distances of respective roads before learning and the delivery costs corresponding to respective roads after learning from a delivery destination D1 to a delivery destination D3.

FIG. 6 is an explanatory diagram showing one example of distances of respective roads before learning and delivery costs corresponding to respective roads after learning from the delivery destination D1 to the delivery destination D3. In a case of traveling from the delivery destination D1 to the delivery destination D3, when traveling a straight delivery route R1 that is the shortest distance before learning, the distance becomes "8+8+9", which is "25." Meanwhile, for a delivery route R2 the skilled driver uses by making a detour, the total distance is "8+2+8+3+9", which is "30." Therefore, before learning, since traveling the shortest distance delivery route R1 is shorter in distance than the detour delivery route R2, it seems that traveling using the delivery route R1 is more preferable in terms of delivery efficiency.

However, after learning by travel history learning unit 12, the road cost of each road ID, which indicates an indicator that reflects an actual state of each road, changes dynamically (that is, by timing) as a result of reflection of the actual state, unlike static distance values (that is, fixed in advance). Therefore, in a case of traveling from the delivery destination D1 to the delivery destination D3, when traveling the shortest distance delivery route R1, the delivery cost is "1+8+1", which is "10." Meanwhile, for the delivery route R2 the skilled driver uses by making a detour, the total delivery cost is "1+1+1+1+1", which is "5." Therefore, after learning, the delivery cost is lower when traveling the delivery route R2 the skilled driver uses by making a detour than when traveling the shortest distance delivery route R1. In this way, instead of selecting the delivery route based on the simple distance, selecting the delivery route based on the delivery cost makes it possible to generate (formulate) the delivery plan that can reduce a delivery burden on the driver.

Delivery plan computation unit 34 computes the delivery plan based on a computation result of the delivery cost from the starting point to the destination in the delivery range generated by delivery cost generation unit 32.

Note that in a case where road learning model generation device 5 and delivery plan generation device 30 include the same PC or server device, road NW and road feature for delivery reading units 13, 33, road learning model for delivery storage units 14, 44, and road NW and road feature for delivery storage units 15, 45 may each be shared.

Communication unit 47 is connected to the client terminal (not shown) via, for example, a wireless local area network (LAN). Communication between communication unit 47 and the client terminal is not limited to the wireless LAN, but may be connected by a wired LAN, or may be directly connected via an interface such as serial communication/ parallel communication. Communication unit 47 (one example of an acquisition unit) functions as a communication interface that manages communication between delivery plan generation device 30 and the connected client terminal. Communication unit 47 receives, for example, the delivery plan generation request from the client terminal (that is, a delivery plan generation request corresponding to the package delivery range). Communication unit 47 then responds to the client terminal with an output of delivery plan computation unit 34. Note that in a case where road learning model generation device 5 and delivery plan generation device 30 include the same PC or server device, communication unit 47 may be shared with communication unit 17.

Next, an operation of delivery plan generation device 30 according to the present exemplary embodiment will be described.

In a case where road learning model generation device 5 and delivery plan generation device 30 include the same PC or server device, this operation is performed at different timing. Road learning model for delivery storage unit 44 stores the road learning model that has been learned by travel history learning unit 12 (that is, generated by travel history learning unit 12).

Figure 7:
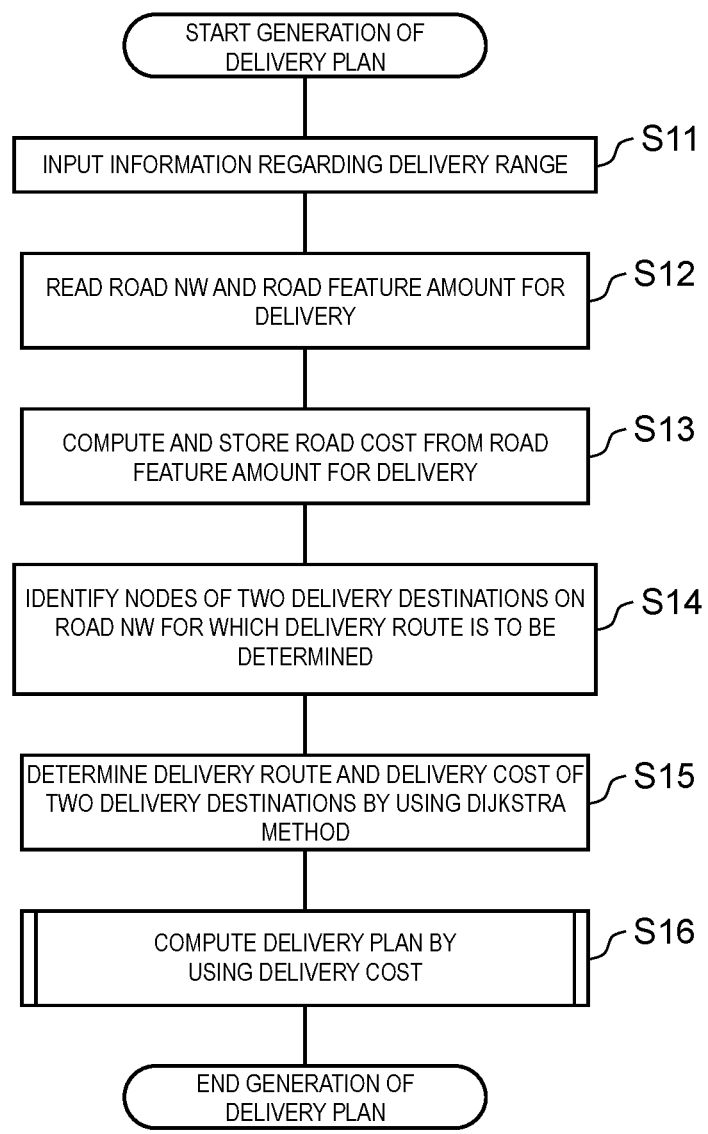
FIG. 7 is a flowchart showing in detail one example of a procedure for generating a delivery plan in the delivery plan generation device according to the second exemplary embodiment.

FIG. 7 is a flowchart showing in detail one example of a procedure for generating the delivery plan by delivery plan generation device 30 according to the second exemplary embodiment.

In FIG. 7, processor 37 receives and inputs information regarding the package delivery range, which is input by a user operation and transmitted from the client terminal (SU). Road NW and road feature for delivery reading unit 33 accesses road NW and road feature for delivery storage unit 45, and reads the road network information and the road feature amount corresponding to the package delivery range acquired in step S11 (S12).

Road cost for delivery computation unit 31 accesses road learning model for delivery storage unit 44, and acquires the learned road learning model corresponding to the road network information read by road NW and road feature for delivery reading unit 33 in step S12. By using the acquired learned road learning model and the road feature amount read by road NW and road feature for delivery reading unit 33 in step S12, road cost for delivery computation unit 31 computes the road cost corresponding to each of one or more roads included in the package delivery range input in step S11, and stores a computation result in road NW for delivery storage unit 46 in association with the road ID of the road (S13).

Regarding the road network information corresponding to the package delivery range read in step S12, delivery cost generation unit 32 sequentially identifies nodes of two delivery destinations (including base) for which the delivery route is to be determined (S14). Delivery cost generation unit 32 determines the delivery route having two sequentially identified delivery destination nodes by using the Dijkstra method, and computes the delivery cost corresponding to the determined delivery route (S15).

Delivery plan computation unit 34 computes the delivery plan by using the delivery cost determined in step S15 (S16). The delivery route in the road network information is determined by computation of the delivery plan based on the delivery cost. Note that details of computation of the delivery plan will be described later. After step S16, processing of delivery plan generation device 30 ends.

Figure 8:
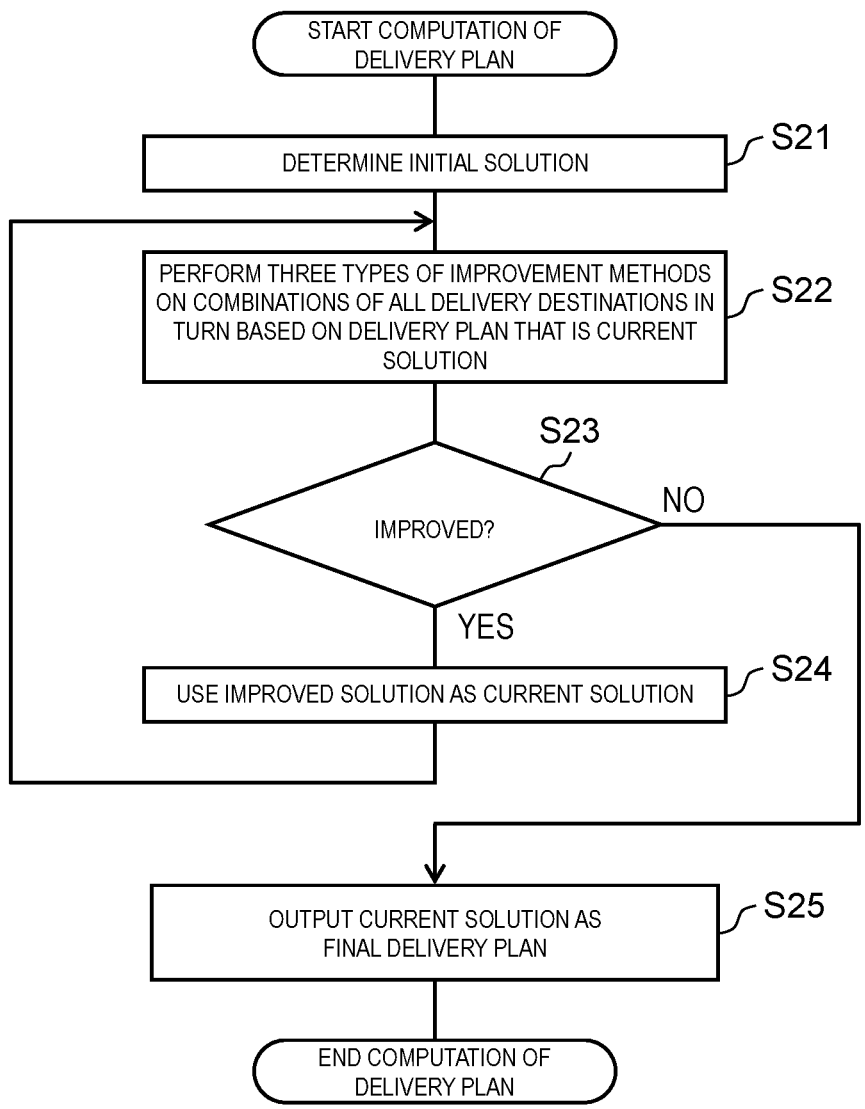
FIG. 8 is a flowchart showing in detail one example of a procedure for computing the delivery plan in step S16 of FIG. 7.

FIG. 8 is a flowchart showing in detail one example of a procedure for computing the delivery plan in step S16 of FIG. 7.

In FIG. 8, delivery plan computation unit 34 determines an initial solution of the delivery plan by using the delivery cost determined in step S15 (S21). Here, the initial solution of the delivery plan is a delivery plan including the delivery route and the delivery cost determined in step S15 described above. Note that the initial solution may be a delivery plan manually formulated by the skilled driver based on the delivery route and the delivery cost determined in step S15 described above.

Figure 9:
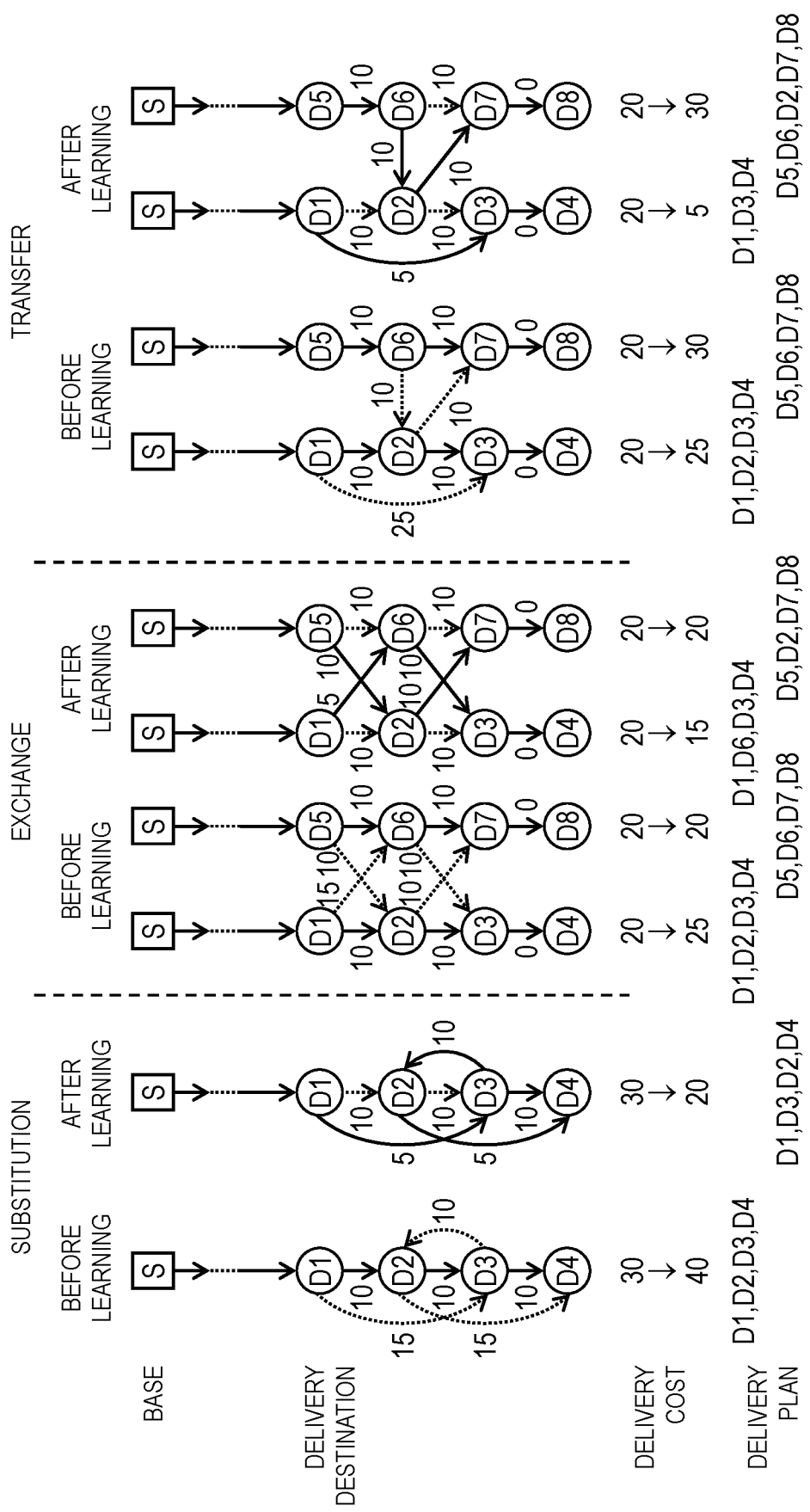
FIG. 9 is an explanatory diagram showing one example of three types of improvement methods used in step S22 of FIG. 8.

Delivery plan computation unit 34 performs, for example, three types of improvement methods shown in FIG. 9 on combinations of all the delivery destinations in turn based on the delivery plan that is the current solution (S22). Here, the current solution is the initial solution determined in step S21 or the improved solution obtained in step S24 described later.

FIG. 9 is an explanatory diagram showing one example of three types of improvement methods used in step S22 of FIG. 8. The three types of improvement methods are, for example, substitution, exchange, and transfer. Substitution represents interchanging order of delivery destinations. Exchange represents interchanging delivery destinations between a plurality of delivery routes. Transfer represents transferring a delivery destination to another delivery route. Specific examples of substitution, exchange, and transfer are shown in (A), (B), and (C) below.

(A) Substitution

In the delivery plan before learning, before substitution, delivery is made for one delivery vehicle in delivery order of base S→delivery destinations D1→D2→D3→D4. In the delivery plan before learning and before substitution, the delivery cost (in other words, distance) is "10+10+10=30" corresponding to the same first delivery vehicle.

Meanwhile, before learning and after substitution, delivery is made for the same one delivery vehicle in delivery order of base S→delivery destinations D1→D3→D2→D4. In the delivery plan before learning and after substitution, the delivery cost is "15+10+15=40" corresponding to the same one delivery vehicle. Therefore, if substitution is made before learning, the delivery cost will increase and delivery plan will not be improved. Note that before learning may be before the learning is started or immediately after the learning is started. The same is true of (B) and (C) below.

Meanwhile, in the delivery plan after learning, before substitution, delivery is made for one delivery vehicle in delivery order of base S→delivery destinations D1→D2→D3→D4. In the delivery plan after learning and before substitution, the delivery cost (in other words, distance) is "10+10+10=30" corresponding to the same first delivery vehicle, which is the same as before learning.

Meanwhile, after learning and after substitution, delivery is made for the same one delivery vehicle in delivery order of base S→delivery destinations D1→D3→D2→D4. In the delivery plan after learning and after substitution, the delivery cost is "5+10+5=20" corresponding to the same first delivery vehicle. Therefore, when substitution is made after learning, the delivery cost is reduced and the delivery plan is improved. Note that after learning means that a considerable amount of learning has been completed. The same is true of (B) and (C) below.

(B) Exchange

In the delivery plan before learning, before exchange, delivery is made for the first delivery vehicle in delivery order of base S→delivery destinations D1→D2→D3→D4, and delivery is made for the second delivery vehicle in delivery order of base S→delivery destinations D5→D6→D7→D8. In the delivery plan before learning and before exchange, the delivery cost (in other words, distance) is "40" obtained by adding "10+10+0=20" corresponding to the same first delivery vehicle to "10+10+0=20" corresponding to the same second delivery vehicle.

Meanwhile, before learning and after exchange, delivery is made for the same first delivery vehicle in delivery order of base S→delivery destinations D1→D6→D3→D4, and delivery is made for the same second delivery vehicle in delivery order of base S→delivery destinations D5→D2→D7→D8. In the delivery plan before learning and after exchange, the delivery cost (in other words, distance) is "45" obtained by adding "15+10+0=25" corresponding to the first delivery vehicle to "10+10+0=20" corresponding to the second delivery vehicle. Therefore, if exchange is made before learning, the overall delivery cost will increase and the delivery plan will not be improved.

Meanwhile, in the delivery plan after learning, before exchange, delivery is made for the first delivery vehicle in delivery order of base S→delivery destinations D1→D2→D3→D4, and delivery is made for the second delivery vehicle in delivery order of base S→delivery destinations D5→D6→D7→D8. In the delivery plan after learning and before exchange, the delivery cost is "40" obtained by adding "10+10+0=20" corresponding to the first delivery vehicle to "10+10+0=20" corresponding to the second delivery vehicle, which is the same as before learning.

Meanwhile, after learning and after exchange, delivery is made for the same first delivery vehicle in delivery order of base S→delivery destinations D1→D6→D3→D4, and delivery is made for the same second delivery vehicle in delivery order of base S→delivery destinations D5→D2→D7→D8. In the delivery plan after learning and after exchange, the delivery cost is "35" obtained by adding "5+10+0=15" corresponding to the same first delivery vehicle to "10+10+0=20" corresponding to the same second delivery vehicle. Therefore, when exchange is made after learning, the overall delivery cost after learning is reduced and the delivery plan is improved.

(C) Transfer

In the delivery plan before learning, before transfer, in a similar manner to the exchange, delivery is made for the first delivery vehicle in delivery order of base S→delivery destinations D1→D2→D3→D4, and delivery is made for the second delivery vehicle in delivery order of base S→delivery destinations D5→D6→D7→D8. In the delivery plan before learning and before transfer, in a similar manner to the exchange, the delivery cost (in other words, distance) is "40" obtained by adding "10+10+0=20" corresponding to the first delivery vehicle to "10+10+0=20" corresponding to the second delivery vehicle.

Meanwhile, before learning and after transfer, delivery is made for the same first delivery vehicle in delivery order of base S→delivery destinations D1→D3→D4, and delivery is made for the same second delivery vehicle in delivery order of base S→delivery destinations D5→D6→D2→D7→D8. In the delivery plan before learning and after transfer, the delivery cost (in other words, distance) is "55" obtained by adding "25+0=25" corresponding to the first delivery vehicle to "10+10+10+0=30" corresponding to the second delivery vehicle. Therefore, if transfer is made before learning, the overall delivery cost will increase and the delivery plan will not be improved.

Meanwhile, in the delivery plan after learning, before transfer, delivery is made for the first delivery vehicle in delivery order of base S→delivery destinations D1→D2→D3→D4, and delivery is made for the second delivery vehicle in delivery order of base S→delivery destinations D5→D6→D7→D8. In the delivery plan after learning and before transfer, the delivery cost is "40" obtained by adding "10+10+0=20" corresponding to the first delivery vehicle to "10+10+0=20" corresponding to the second delivery vehicle, which is the same as before learning.

Meanwhile, after learning and after transfer, in a similar manner to before learning, delivery is made for the same first delivery vehicle in delivery order of base S→delivery destinations D1→D3→D4, and delivery is made for the same second delivery vehicle in delivery order of base S→delivery destinations D5→D6→D2→D7→D8. In the delivery plan after learning and after transfer, the delivery cost is "35" obtained by adding "5+0=5" corresponding to the same first delivery vehicle to "10+10+10+0=30" corresponding to the same second delivery vehicle. Therefore, when transfer is made after learning, the overall delivery cost after learning is reduced and the delivery plan is improved.

As a result of performing the three types of improvement methods on combinations of all the delivery destinations, delivery plan computation unit 34 determines whether the delivery plan has been improved (S23). Improving the delivery plan corresponds to reducing the delivery cost. When the delivery plan has been improved, delivery plan computation unit 34 uses the improved delivery plan as the current solution (S24). Processing of delivery plan computation unit 34 returns to step S22.

On the other hand, when the delivery plan has not been improved in step S23 (S23, NO), delivery plan computation unit 34 responds (outputs) from communication unit 47 to the client terminal by using the current solution as the final delivery plan (S25). The client terminal displays the final delivery plan on a monitor (not shown). The monitor displays, for example, the delivery plan after learning (including the delivery cost and the delivery route) shown in FIG. 9. Note that in the present exemplary embodiment, the improvement of the delivery plan is examined using three types of improvement methods, but the delivery plan may be computed without using the three types of improvement methods.

As described above, in delivery plan generation device 30 according to the second exemplary embodiment, road learning model for delivery storage unit 44 stores the road learning model for calculating, for each of one or more roads, the road cost indicating the delivery efficiency during travel of the one or more roads in association with information regarding the package (article) delivery range. Road NW and road feature for delivery storage unit 45 stores the road network information and the road feature amount (one example of information regarding the roads). Road cost for delivery computation unit 31 computes the road cost for each of the one or more roads included in the package delivery range based on the road learning model and the road feature amount corresponding to the package delivery range. Using the computed road cost, delivery plan computation unit 34 computes the delivery plan when traveling within the package delivery range.

With this configuration, delivery plan generation device 30 can calculate the delivery cost corresponding to the roads to the delivery destination by using the road learning model that can calculate the road cost with high delivery efficiency when the driver delivers a plurality of packages. Therefore, delivery plan generation device 30 can formulate the optimal delivery plan that matches the actual road state.

Using the computed road cost, delivery cost generation unit 32 computes the delivery cost for each of one or more delivery routes for delivering packages to a plurality of delivery destinations included in the package delivery range. Delivery plan computation unit 34 computes the delivery plan based on the computed delivery cost. With this configuration, delivery plan generation device 30 can formulate the delivery plan to reduce the delivery cost (in other words, increase delivery efficiency of the driver during the delivery), and generate the delivery plan that can increase the delivery efficiency during smooth package delivery.

Communication unit 47 (one example of an output unit) outputs the computed delivery plan to the monitor of the client terminal. With this configuration, the user can visually and intuitively check the delivery plan generated by delivery plan generation device 30.

Delivery plan generation device 30 can compute the delivery plan in response to the delivery plan generation request including information regarding the package delivery range based on the user operation from the client terminal (not shown) connected to the own device (that is, delivery plan generation device 30), and responds to the client terminal with the computed delivery plan. With this configuration, the user can request delivery plan generation device 30 to generate the delivery plan via the client terminal, and determine the delivery plan by viewing the monitor of the client terminal (not shown), improving usability.

The exemplary embodiments have been described above with reference to the drawings, but it is needless to say that the present disclosure is not limited to such examples. It is obvious that a person skilled in the art can conceive various changes or modifications within the categories described in the claims, and naturally it is to be understood that these also belong to the technical scope of the present disclosure. Moreover, the components in the exemplary embodiments described above may be optionally combined without departing from the spirit of the invention.

For example, delivery plan generation device 30 according to the second exemplary embodiment described above may have a configuration further including the configuration of road learning model generation device 5 according to the first exemplary embodiment. With this configuration, delivery plan generation device 30 can obtain not only effects of the configuration of delivery plan generation device 30, but also effects of the configuration of road learning model generation device 5. For example, when a driver delivers a plurality of packages, delivery plan generation device 30 can efficiently generate the road learning model that can not only formulate the optimal delivery plan that matches the actual road state, but also calculate the road cost with high delivery efficiency when the driver delivers a plurality of packages regardless of the type of skilled driver or general driver.

For example, in the above-described exemplary embodiments, a plurality of types of table representing the delivery cost (see FIG. 5B) may be prepared in order to make it possible to use the road cost depending on the delivery destination even if the delivery range is the same. For example, a plurality of tables may be prepared by separating by frequency delivery destinations to which delivery is made often and delivery destinations to which delivery is rarely made.

In the above-described exemplary embodiments, the final delivery plan is transmitted to the client terminal and displayed on the monitor of the client terminal. However, delivery plan generation device 30 itself may include a monitor and an output interface, and display the delivery plan on the monitor of delivery plan generation device 30 instead of the client terminal.

In the above-described exemplary embodiments, delivery plan computation unit 34 may compute the delivery plan by another method using the road cost for delivery without using the delivery cost of delivery cost generation unit 32.

Note that in the above-described exemplary embodiments, travel history learning unit 12 may perform travel history learning (for example, inverse reinforcement learning) in units of individual delivery destinations. At this time, travel history learning unit 12 learns the travel history by using only the travel history when making delivery to the intended delivery destination as the travel history. Also, travel history learning unit 12 may learn the travel history by using the travel history when making delivery from an immediately preceding delivery destination to a next delivery destination as the travel history. The road network information at that time may correspond to the minimum delivery range including the corresponding travel history. Alternatively, the delivery destinations may be divided into areas, and the road network information of each divided area may be used.

Furthermore, in the above-described exemplary embodiments, travel history learning unit 12 may combine a plurality of generated road learning models and use the combined road learning models as the road learning model. For example, travel history learning unit 12 may use an average value of a plurality of road learning models.

A program that implements functions of the devices of the exemplary embodiments and is supplied to the devices via a network or various types of storage medium and read and executed by a computer in the devices, and the storage medium are also within the scope of the present disclosure.

INDUSTRIAL APPLICABILITY

The present disclosure is useful, in delivery of a plurality of packages, as a road learning model generation device, a road learning model generation method, a delivery plan generation device, and a delivery plan generation method that effectively support formulation of an optimal package delivery plan according to a road state to a delivery destination and significantly reduce a burden on a driver who delivers each package.

What is claimed is:

1. A delivery plan generation method comprising:
acquiring delivery range information regarding a delivery range of an article;
acquiring feature information items for each of roads corresponding to the delivery range information;
acquiring road network information indicating a connection relationship between the roads;
generating a reward model of a road learning model by inverse reinforcement learning, the reward model being generated using, as input teacher data, a plurality of pieces of travel history, each of the plurality of pieces of travel history including a travel history of a delivery vehicle delivering the article and the corresponding feature information item for each of roads corresponding to the travel history, the inverse reinforcement learning generating the reward model by quantitively calculating an efficiency of each of the plurality of pieces of travel history;
computing, using the road learning model including the reward model, road costs each corresponding to a corresponding one of the roads based on the feature information items, the road costs being computed by computing rewards for the feature information items based on the reward model and converting the rewards into the road costs by taking a reciprocal of the rewards, and the road costs being output as output of the road learning model in response to the feature information items being input to the road learning model; and
generating a delivery plan by using the road network information and the road costs.

2. The delivery plan generation method according to claim 1, wherein the travel history is a travel history in a range different from the delivery range.

3. The delivery plan generation method according to claim 1, wherein the travel history is a travel history in a range identical to the delivery range.

4. The delivery plan generation method according to claim 1, wherein the travel history is a set of one or more road identifiers each identifying a corresponding one of one or more roads traveled when the delivery vehicle delivers an article.

5. The delivery plan generation method according to claim 1, wherein one of the feature information items is an information item regarding a turn of each of the roads.

6. The delivery plan generation method according to claim 1, wherein one of the feature information items is an information item regarding a width of each of the roads.

7. The delivery plan generation method according to claim 1, wherein one of the feature information items is an information item regarding a median strip of each of the roads.

8. The delivery plan generation method according to claim 1, wherein one of the feature information items is an information item regarding whether a trunk road crosses each of the roads.

9. The delivery plan generation method according to claim 1, wherein one of the feature information items is an information item regarding an elevation variation of each of the roads.

10. A delivery plan generation device comprising:
a processor; and
a non-transitory memory having stored thereon executable instructions, which cause the processor to perform:
- acquiring delivery range information regarding a delivery range of an article;
- acquiring feature information items for each of roads corresponding to the delivery range information;
- acquiring road network information indicating a connection relationship between the roads;
- generating a reward model of a road learning model by inverse reinforcement learning, the reward model being generated using, as input teacher data, a plurality of pieces of travel history, each of the plurality of pieces of travel history including a travel history of a delivery vehicle delivering the article and the corresponding feature information item for each of roads corresponding to the travel history, the inverse reinforcement learning generating the reward model by quantitively calculating an efficiency of each of the plurality of pieces of travel history;
- computing, using the road learning model including the reward model, road costs each corresponding to a corresponding one of the roads based on the feature information items, the road costs being computed by computing rewards for the feature information items based on the reward model and converting the rewards into the road costs by taking a reciprocal of the rewards, and the road costs being output as output of the road learning model in response to the feature information items being input to the road learning model; and
- generating a delivery plan by using the road network information and the road costs.

11. The delivery plan generation device according to claim 10, wherein the travel history is a travel history in a range different from the delivery range.

12. The delivery plan generation device according to claim 10, wherein the travel history is a travel history in a range identical to the delivery range.

13. The delivery plan generation device according to claim 10, wherein the travel history is a set of one or more road identifiers each identifying a corresponding one of one or more roads traveled when the delivery vehicle delivers an article.

14. The delivery plan generation device according to claim 10, wherein one of the feature information items is an information item regarding a turn of each of the roads.

15. The delivery plan generation device according to claim 10, wherein one of the feature information items is an information item regarding a width of each of the roads.

16. The delivery plan generation device according to claim 10, wherein one of the feature information items is an information item regarding a median strip of each of the roads.

17. The delivery plan generation device according to claim 10, wherein one of the feature information items is an information item regarding whether a trunk road crosses each of the road.

18. The delivery plan generation device according to claim 10, wherein one of the feature information items is an information item regarding an elevation variation of each of the roads.

* * * * *